(12) United States Patent
Drerup et al.

(10) Patent No.: US 11,635,968 B2
(45) Date of Patent: Apr. 25, 2023

(54) USING IDLE CACHES AS A BACKING STORE FOR BOOT CODE

(71) Applicant: INTERNATIONAL BUSINESS MACHINES CORPORATION, Armonk, NY (US)

(72) Inventors: Bernard C. Drerup, Austin, TX (US); Guy L. Guthrie, Austin, TX (US); Joseph John McGill, IV, Austin, TX (US); Alexander Michael Taft, Austin, TX (US); Derek E. Williams, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/447,759

(22) Filed: Sep. 15, 2021

(65) Prior Publication Data

US 2023/0078861 A1    Mar. 16, 2023

(51) Int. Cl.
*G06F 9/4401* (2018.01)
*G06F 13/28* (2006.01)
*G06F 12/0842* (2016.01)
*G06F 9/445* (2018.01)
*G06F 12/0897* (2016.01)

(52) U.S. Cl.
CPC ............ *G06F 9/4401* (2013.01); *G06F 9/445* (2013.01); *G06F 9/44505* (2013.01); *G06F 12/0842* (2013.01); *G06F 12/0897* (2013.01); *G06F 13/28* (2013.01)

(58) Field of Classification Search
CPC .... G06F 9/4401; G06F 9/445; G06F 9/44505; G06F 12/0842; G06F 12/0897; G06F 13/28
See application file for complete search history.

(56) References Cited

U.S. PATENT DOCUMENTS

| 7,254,676 | B2 | 8/2007 | Datta | |
|---|---|---|---|---|
| 8,078,862 | B2 | 12/2011 | Zimmer et al. | |
| 8,352,718 | B1* | 1/2013 | Rao | G06F 9/4401 713/1 |
| 10,776,046 | B1 | 9/2020 | Dreier | |
| 2004/0103272 | A1* | 5/2004 | Zimmer | G06F 9/4403 713/1 |
| 2005/0172113 | A1* | 8/2005 | Lee | G06F 9/4403 713/2 |
| 2008/0005549 | A1* | 1/2008 | Ke | G06F 9/4401 713/1 |
| 2010/0115202 | A1* | 5/2010 | Zimmer | G06F 12/126 711/E12.017 |
| 2012/0203973 | A1* | 8/2012 | Guthrie | G06F 12/0811 711/E12.07 |
| 2013/0031346 | A1* | 1/2013 | Sakarda | G06F 9/4401 713/2 |
| 2017/0262370 | A1* | 9/2017 | Kapoor | G06F 12/0811 |

* cited by examiner

*Primary Examiner* — Glenn A. Auve
(74) *Attorney, Agent, or Firm* — Kristofer L. Haggerty

(57) ABSTRACT

The present disclosure may include a processor that uses idle caches as a backing store for a boot code. The processor designates a boot core and an active cache from a plurality of cores and a plurality of caches. The processor configures remaining caches from the plurality of caches to act as a backing store memory. The processor modifies the active cache to convert cast outs to a system memory into lateral cast outs to the backing store memory. The processor copies a boot image to the backing store memory and executes the boot image by the boot core.

20 Claims, 14 Drawing Sheets

USING IDLE CACHES AS A BACKING STORE FOR BOOT CODE

BACKGROUND

The present disclosure relates, generally, to the field of computing and more particularly to utilizing idle caches for boot code backing and execution.

A conventional multiprocessor (MP) computer system, such as a server computer system, includes multiple processing units all coupled to a system interconnect, which typically comprises one or more address, data, and control buses. Coupled to the system interconnect is a system memory, which represents the lowest level of volatile memory in the multiprocessor computer system, and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the upper-level cache. If the requested memory block is not found in the upper-level cache or the request cannot be entirely satisfied at the upper-level cache, the processor core then accesses lower-level caches (e.g., level two (L2) or level three (L3) caches) or system memory as necessary to complete the requested memory operation for the requested block.

SUMMARY

According to one embodiment, a method, processing unit, and data processing system is provided. The present disclosure may include a processor that uses idle caches as a backing store for a boot code. The processor designates a boot core and an active cache from a plurality of cores and a plurality of caches. The processor configures remaining caches from the plurality of caches to act as a backing store memory. The processor modifies the active cache to convert cast outs to a system memory into lateral cast outs to the backing store memory. The processor copies a boot image to the backing store memory and executes the boot image by the boot core.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the disclosure in conjunction with the detailed description. In the drawings.

DETAILED DESCRIPTION

Figure 1:
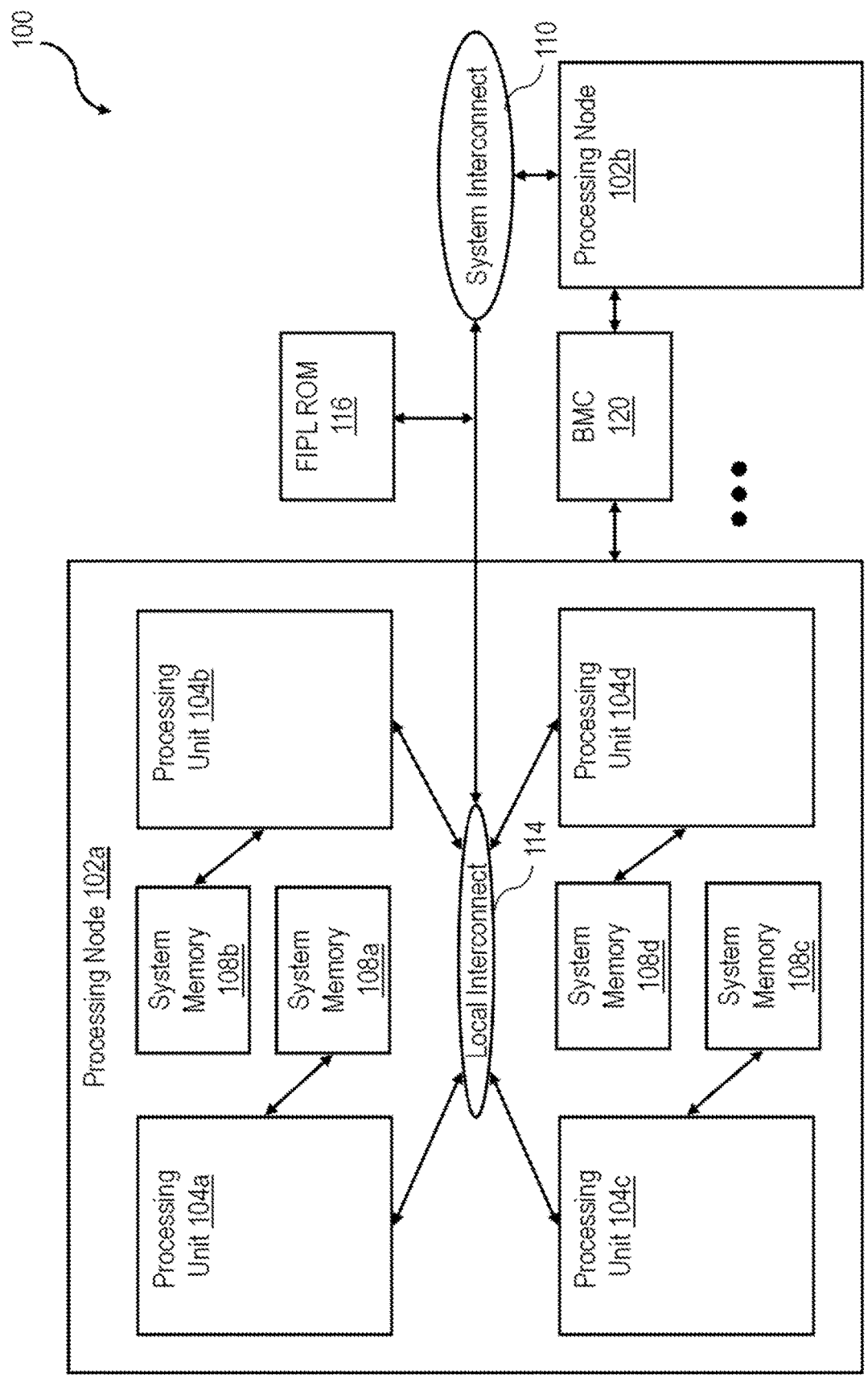
FIG. 1 is a high-level block diagram of an exemplary data processing system according to at least one embodiment.

Detailed embodiments of the claimed structures and methods are disclosed herein; however, it can be understood that the disclosed embodiments are merely illustrative of the claimed structures and methods that may be embodied in various forms. This disclosure may, however, be embodied in many different forms and should not be construed as limited to the exemplary embodiments set forth herein. In the description, details of well-known features and techniques may be omitted to avoid unnecessarily obscuring the presented embodiments.

Booting of multiprocessor (MP) systems is often performed by a single booting processor core that executes the required boot code image. The boot code image is typically pre-loaded into a lower-level cache by a hardware means and the processor core is released to execute the boot code from the pre-loaded image in the lower-level cache. The boot image and the executed code are constructed so as to not require any cache evictions (also known as cast outs) during execution. This is due to the fact that, for significant portions of the boot code execution, system memory is not initialized and is therefore unavailable. Therefore, instruction fetches of the boot code image and memory accesses made by the boot code must take place within the local caches directly associated with the core. In such systems, however, the size of the local caches directly associated with the booting core can severely limit the size of the boot code image. Embodiments of the present disclosure relate to the field of computing, and more particularly to utilizing idle caches for boot code image storage. The following described exemplary embodiments provide a system, method, and a unit to, among other things, extend the storage footprint beyond the local cache(s) of the core running the boot code sequence without requiring system memory to be active. Therefore, the present embodiment has the capacity to improve the technical field of booting a conventional multiprocessor (MP) computer system by enabling execution of boot code that is larger than the local cache(s) of the boot core.

Due to ever increasing demands for larger boot code images, the local cache size of the booting core may be insufficient to store and execute the boot code. As such, it may be advantageous to, among other things, implement a system that enables booting a larger storage footprint by configuring one (or more) caches associated with other cores that would otherwise be inactive while booting the system as a backing storage that may act as a system memory. In order to enable these otherwise inactive caches to act as a backing storage for the boot code image, a unique configuration of the system, system logic and a designation among the core/cache-set on one or more processors chips as either "Active" or "Backing" is sought.

According to at least one embodiment, one or more cores and associated caches may be configured as an active core/cache-set and perform an execution of the boot loader code with one of these cores designated as a master boot core. Some or all of the caches of the remaining core/cache sets in the system may be configured to act as a backing-store memory that may cover a fixed range of the physical address space by placing these caches in a direct-mapped mode configuration and assigning to each such cache a discrete region of the physical address space that matches the size of the cache. For a cache in direct-mapped mode, the cache block corresponding to an address that may be held by the cache may only be stored in one specific cache-line sized position in the cache, but differing addresses (generally separated by more than the cache size but mapping to the same location within the cache) may occupy the same specific position in the cache. Therefore, with a cache sized range of memory associated with a given cache in direct mapped mode, each cache-block sized portion of the assigned address space is allocated to a unique position within the cache. In effect, a cache so configured can emulate system memory for the address range assigned to that cache.

According to an example embodiment, each of the processor cores that are not an active-core that can run the boot code-image may be placed in a paused or powered down state. This prevents memory accesses from these cores that would indiscriminately alter the cache-sets associated with those cores and allows those cache-sets to be re-purposed, if desired, as backing storage for the boot-code image. While all the cache-sets from inactive cores may be utilized as backing store caches, this is not required, and some portion of the inactive core/cache-sets can be entirely inactive during the boot process.

When a new cache line is established in a cache (e.g., due to a request to bring the line into a cache or a cache line eviction from a higher level cache into a lower level cache), it may be necessary to evict a cache line from the cache to make room for the new line. In many caches, this eviction is processed by writing the contents of the cached line back to system memory. These evictions are typically referred to as "cast outs". In certain last level caches (the level of caching just above system memory), an additional type of cast outs known as Lateral Cast Outs (LCOs) are supported. A Lateral Cast Out occurs when a given cache evicts a cache line into a neighboring cache instead of into system memory. A cache that accepts an LCO operation may potentially need to evict a line to make room for the incoming LCO cache line. If such an eviction is necessary, the receiving cache will in most cases perform a normal cast out to make room for the incoming LCO line. This prevents a cascading sequence of LCOs among the various caches involved in the LCOs. In addition to the memory address for the line involved in the LCO, and LCO operation typically includes an ID field that specifies which cache amongst a group of caches within the system the LCO is targeted to.

According to one embodiment, in systems that are already equipped with a last level of caching that is capable of performing lateral cast outs (LCOs), the active cache is modified to convert normal cast outs to system memory into lateral cast outs (LCOs) to backing caches that emulate a region of system memory during the boot phase. These LCOs, in contrast to traditional LCOs that are routed to their target cache by an ID field, are routed to the appropriate backing cache based solely on the address of the block being evicted matching the region of physical memory being emulated by the backing cache. An additional field in the LCO command specifies whether the LCO is routed by address or routed by LCO target cache ID. By routing LCOs based both on ID fields and by address, multiple active core/cache-sets may still use traditional LCOs amongst those active cache sets while simultaneously performing address only based LCOs to backing caches emulating memory. Use of traditional LCO operations in a boot phase requires more than one active cache as single cache cannot perform an LCO to itself.

In another embodiment, in systems that do not already have a last level of caching that is capable of performing Lateral Cast outs (LCOs), the caches at the last level of caching are modified to accept normal cast out commands directly to allow backing caches at that level to write the data associated with these cast outs into the backing caches. As with the prior embodiment, backing caches are placed in a direct mapped mode and assigned a specific portion of the physical address space to allow the caches to emulate memory as described above. In either embodiment, backing caches are also configured to accept Direct Memory Access (DMA) writes to memory. This allows I/O devices to be utilized during the boot-load process before system memory is initialized.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize idle caches for boot code backing and execution.

With reference now to the Figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102a, 102b are coupled to a system interconnect 110 for conveying address, data, and control information. System interconnect 110 may be implemented, for example, as a bused interconnect, a switched interconnect, or a hybrid interconnect.

In the depicted embodiment, each processing node 102 is realized as a multi-chip module (MCM) containing multiple (e.g., four) processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form an interconnect fabric.

As described below in greater detail with reference to FIG. 2, processing units (PU) 104 each include a memory controller 206 coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of volatile storage in the distributed shared memory system of data processing system 100. In alternative embodiments, one or more memory controllers 206 (and system memories 108) can be coupled to system interconnect 110 rather than a local interconnect 114.

Further data processing system 100 includes Flash Initial Program Load Read Only Memory (FIPL ROM) 116. FIPL ROM 116 contains the majority of the program code necessary to initialize and configure data processing system 100 at system power on, once a boot loader sequence has completed and copied the contents of FIPL ROM 116 to a cache for execution as described below. Data processing system 100 also contains, as is conventional and known to those skilled in the art, a Baseboard Management Controller (BMC) 120. BMC 120 monitors system characteristics on data processing system 100 provides a means to power on and power off data processing system and provide an initial "reset" indication to processor nodes 102 to initiate the boot phase upon system power on.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
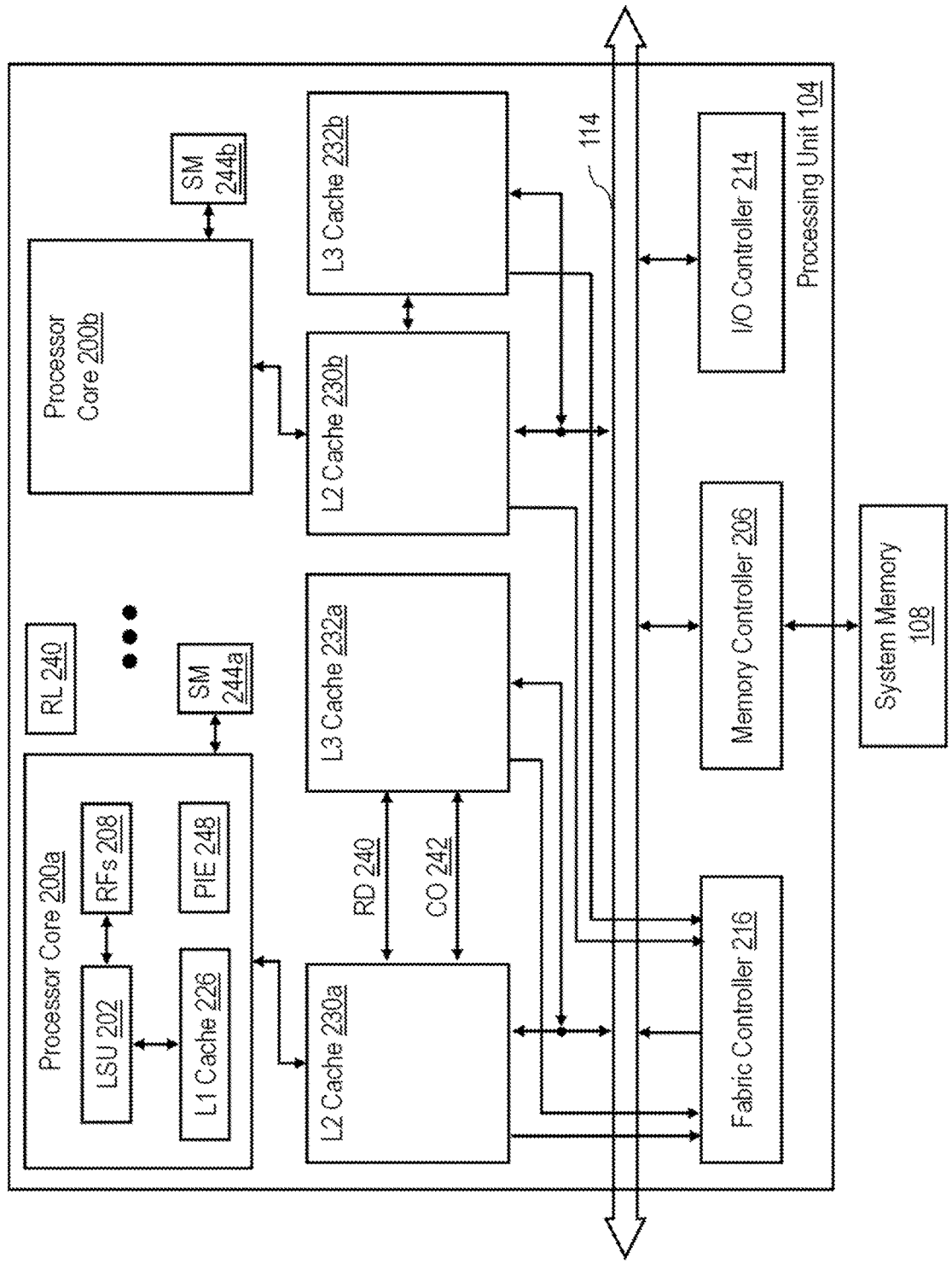
FIG. 2 is a more detailed block diagram of an exemplary processing unit according to at least one embodiment.

Referring now to FIG. 2, that illustrates a more detailed block diagram of an exemplary processing unit 104 in accordance with one embodiment. In the depicted embodiment, each processing unit 104 is an integrated circuit including two or more processor cores such as processor cores 200a, 200b for processing instructions and data. In at least one embodiment, each processor core, such as 200a, 200b is capable of independently executing multiple simultaneous hardware threads of execution.

As depicted, each processor core, such as processor core 200a includes one or more execution units, such as load-store unit (LSU) 202, for executing instructions. The instructions executed by LSU 202 include memory access instructions that request load or store access to a given location in memory. To satisfy these requests, the enclosing cache block or blocks for the location are populated with the various caches (L1 cache 226, L2 cache 230, and L3 cache 232) as necessary. For load accesses, the requested data is returned to one or more registers in register file 208 and for store accesses, the contents of one or more registers in register file 208 are utilized to update the contents of the specified memory locations. According to an embodiment of the current disclosure, each processor core, such as processor core 200a, further incorporates a Processor Initialization Engine (PIE) 248. PIE 248 is a dedicated microcontroller that is utilized to configure various elements in processor core 200 and associated L2 cache 230 and L3 cache 232 and to load the boot code image from FIPL ROM 116 into a local cache associated with the master boot core as described below. Those skilled in the art will recognize that other configurations that do not have a PIE 248 at each core are possible. A small serial memory, SM 244, is provided for each PIE 248 and is operably coupled to processor core 200. SM 244 contains instructions executed by PIE 248 during configuration and boot code loading from FIPL ROM 116.

Reset logic (RL) 240 is responsible for bringing processor core 200a/200b, L2 caches 230a/230b, L3 caches 232a/232b, Fabric Controller 216, Memory Controller 206, PIEs 248, and I/O controller 214 to a known "good" values state after being powered on by BMC 120. After being reset by RL logic 240, these units are in a known good values state (as opposed to the indeterminate state that occurred at the application of power) that is possibly unconfigured (especially for Memory Controller 206 and Fabric Controller 216) state. Once in this state, PIEs 248 are able to execute instructions contained in small serial memory 244 to continue configuring data processing system 100 as part of the boot process.

The operation of each processor core 200 (such as 200a and 200b) is supported by a multi-level memory hierarchy having at its lowest level such as a shared system memory 108 that may be accessed via an integrated memory controller 206, and at its upper levels, one or more levels of cache memory, which in the illustrative embodiment include a store-through level one (L1) cache 226 that may be within and private to each processor core 200, a respective store-in level two (L2) cache 230a, 230b for each processor core 200a, 200b, and a respective lookaside level three (L3) victim cache 232a, 232b for each processor core 200a, 200b populated with cache lines evicted from L2 caches 230a, and 230b respectively. As shown in detail for L2 cache 230a and L3 cache 232a, each L2-L3 cache interface may include a number of channels, including read (RD) channel 240, utilized to provide cache blocks to L2 cache 230 from L3 cache 232, and cast-out (CO) channel 242, utilized to evict cache block from L2 cache 203 to L3 cache 232. Each of L2 caches 230 and L3 caches 232 is further coupled to local interconnect 114 and to a fabric controller 216 to facilitate participation of caches 230, 232 in the coherent data communication of data processing system 100.

Although the illustrated cache hierarchies includes only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents of the upper levels of cache.

Each processing unit 104 further includes an integrated and distributed fabric controller 216 responsible for controlling the flow of operations on the interconnect fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a software thread under execution by a processor core 200 includes a memory access (e.g., load or store) instruction requesting a specified memory access operation to be performed, LSU 202 executes the memory access instruction to determine the target address (e.g., an effective address) of the memory access request. After translation of the target address to a real address, L1 cache 226 is accessed utilizing the target real address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing. In servicing the memory access request, L2 cache 230 may access its associated L3 cache 232 and/or initiate a transaction including the memory access request on the interconnect fabric.

Figure 3:
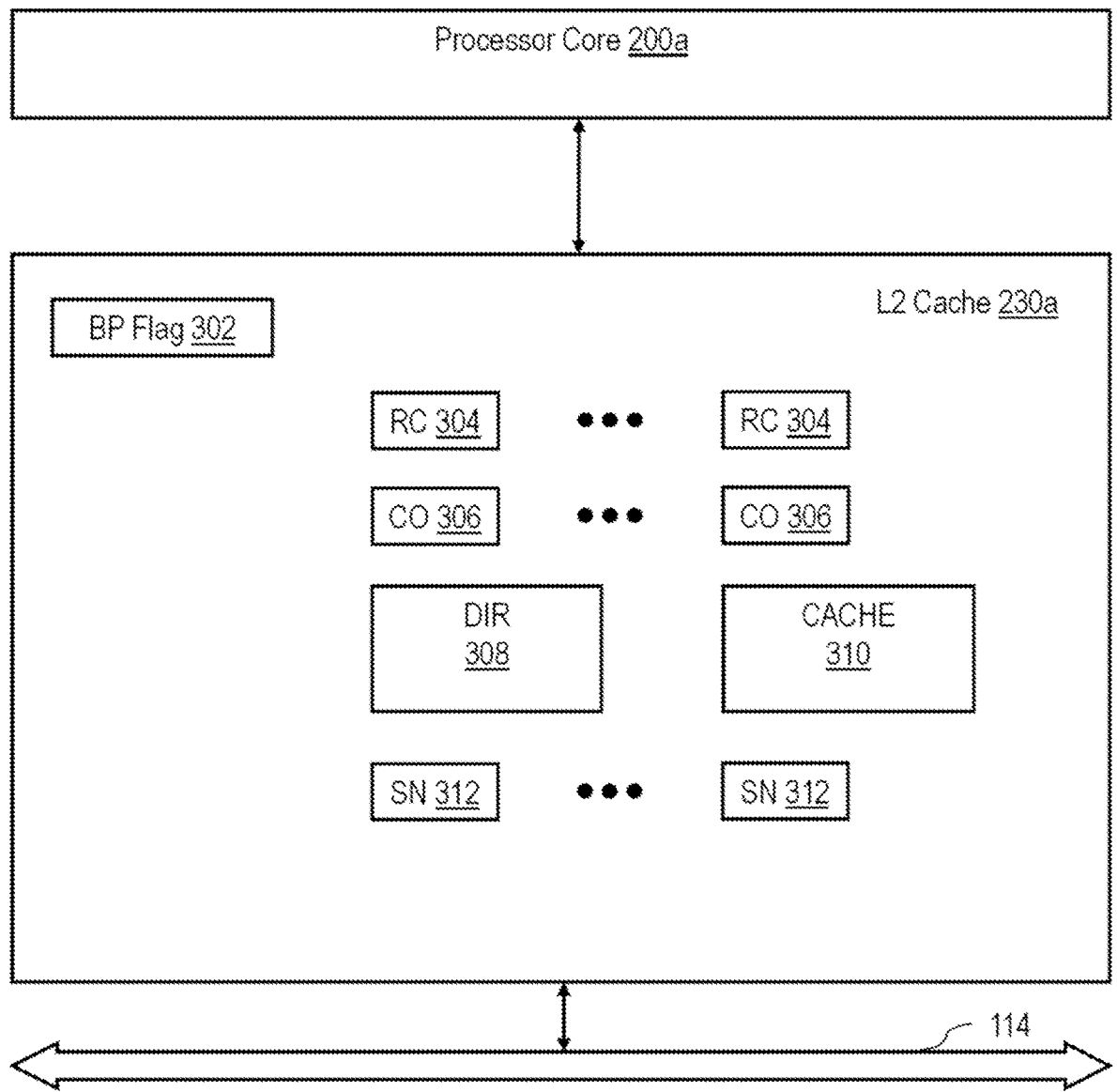
FIG. 3 is a more detailed block diagram of a level two (L2) cache elements according to a first embodiment.

With reference now to FIG. 3, there is illustrated a more detailed block diagram of a level two (L2) cache 230a according to at least one embodiment. According to a first embodiment, the Read/Claim (RC) 304 machines may fulfill requests from the processor core 200a that may be needed to bring data into the L2 cache 230a and from there possibly on to the L1 cache 226 and register file 208 (see FIG. 2). That data can be sourced from the L3 cache attached to the L2 cache 230a directly, some other L2 or L3 cache by data intervention from that cache, or failing all of those options, system memory 108 (FIG. 2). The cast out (CO) 306 machine may be responsible for evicting lines, if necessary, from the L2 cache 230a to make room for new data lines being loaded by the RC 304 machine. Generally, the L2 cache 230a CO 306 machine may evict a line to the L3 cache associated with L2 (cache 230a) or to system memory 108. Either of RC 304 machines or CO 306 machines may alter the contents of directory DIR 308 and/or CACHE 310 as necessary to process requests. Directory DIR 308 may contain information for each block within L2 Cache 230 indicating what address, if any, is stored within that block and the coherence state for the block. Cache array CACHE 310 may contain the data values for the associated memory locations when stored in L2 cache 230. The Snoop (SN) 312 machine may be responsible for monitoring requests from other caches, updating the state of the CACHE 310 and directory, such as DIR 308 as necessary, and providing data to the snooped request as necessary.

According to the first embodiment, the Boot Phase Flag (BP Flag) 302 may be a flag that indicates L2 cache 230a is an active L2 cache executing boot code and that the system is in a "Boot Phase". The "Boot Phase" is a stage when data processing system 100 (FIG. 1), is booting and any active L2 cache 230a must not cast out to system memory 108, but instead only to the L3 cache 232a associated with active L2 cache 230a due to system memory 108 being uninitialized and therefore unavailable.

According to the first embodiment, inactive L2 caches 230 are not utilized as backing caches that emulate system memory 108. Those skilled in the art will recognize that it is possible to remove this restriction and to allow inactive L2 caches 230 and/or inactive L3 caches 232 to be utilized as backing caches.

Figure 4:
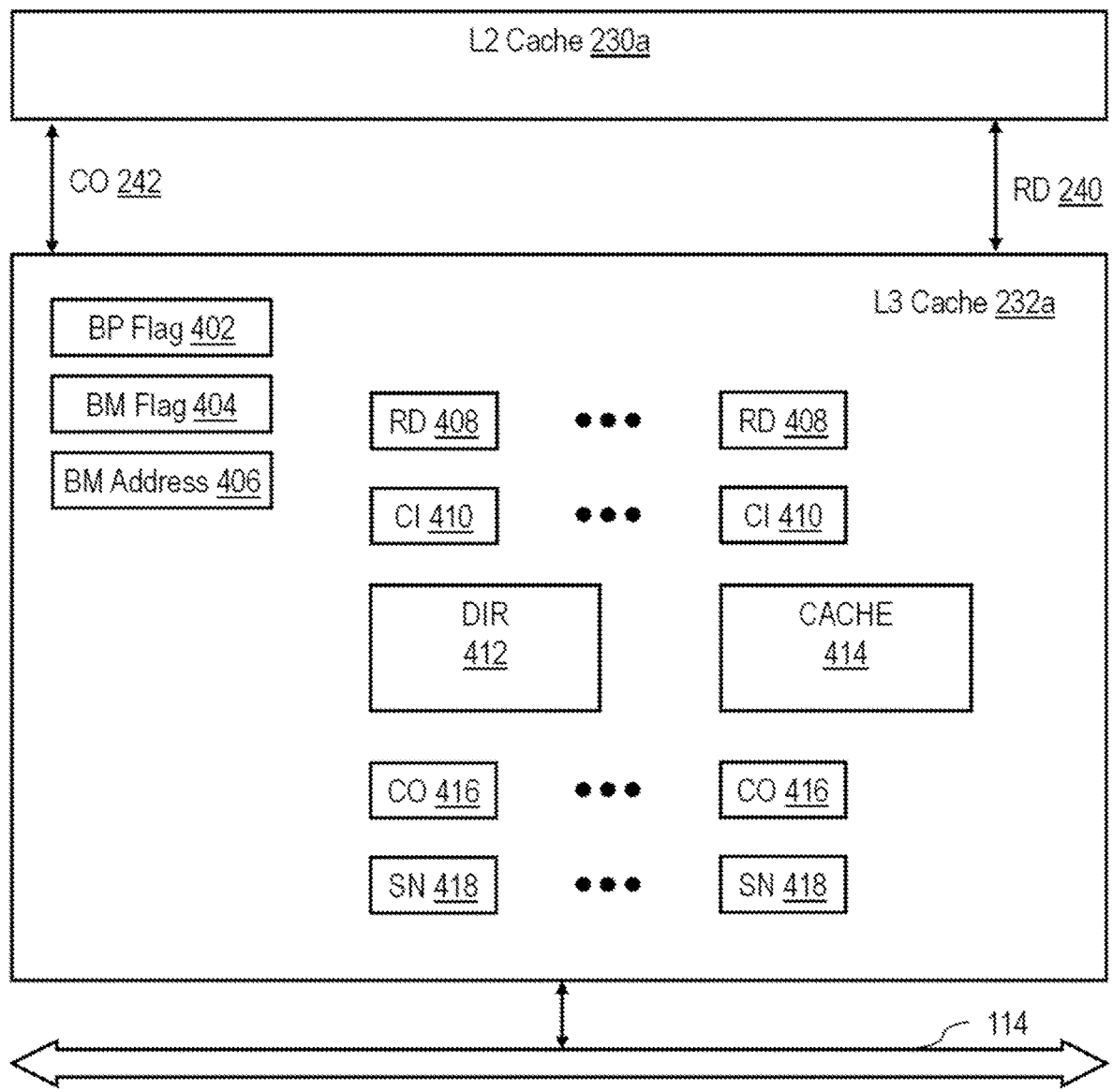
FIG. 4 is a more detailed block diagram of a level three (L3) cache elements according to at least one embodiment.

With reference now to FIG. 4, there is illustrated a more detailed block diagram of a level three (L3) cache 232a according to at least one embodiment. According to the first embodiment, the Read (RD) 408 machines may respond to requests from the L2 cache 230a for data. If the line is present in the L3 cache (L3 cache 232a in FIG. 2), it may be forwarded to the L2 cache 230a and may be invalidated in the L3 cache 232a. The cast-in (CI) 410 machines may process cache line evictions from L2 cache 230a to L3 cache 232a that may be sourced by CO 306 machines (and lateral cast-outs (LCOs) from other L3 caches 232 as is explained below). The CI 410 machine may receive the cast out line from the L2 cache 230a or other L3 cache 232 and, when necessary, employs an L3 Cast-Out (CO) 416 machine to evict a cache line from L3 cache 232a to make room for the new arrival. When a line is cast out of the L3 cache in response to an L2 cache cast out, the line being evicted by the CO 416 machine may generally be laterally cast out (LCO) to another L3 cache, such as L3 cache 232b or the line may be cast-out to system memory, such as system memory 108. Alternatively, if the line being processed by CI 410 machine is due to the LCO of another L3 cache and an eviction from L3 cache 232 is required, CO 416 machine may only cast out the victim line to system memory 108 (this is to prevent an arbitrary loop of LCOs between victim caches; only L3 evictions due to L2 cast outs may be LCO'ed). Either of RD 408 machines, CI 410 machine, or CO 416 machines may alter the contents of directory DIR 412 and/or CACHE 414 as necessary to process requests. Directory DIR 412 may contain information for each block within L3 Cache 232 indicating what address, if any, is stored within that block and the coherence state for the block. Cache array CACHE 414 may contain the data values for the associated memory locations when stored in L3 cache 232. The Snoop (SN) 418 machine may be responsible for monitoring request from other caches, updating the state of the CACHE 414 and directory DIR 412 as necessary, and providing data to the snooped request as necessary.

Figure 10A:
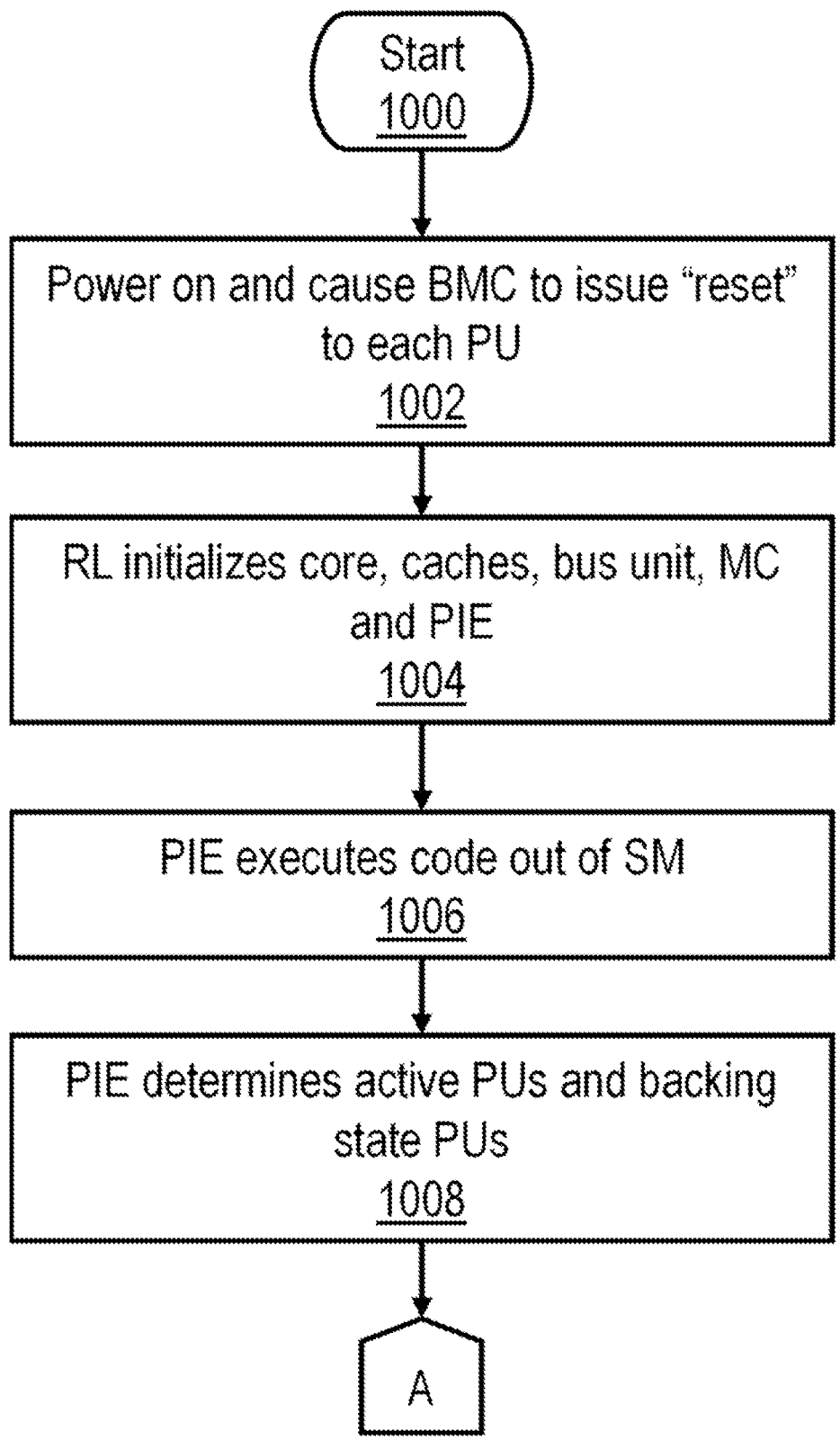
FIGS. 10A-10C are a high-level logical flowcharts of a boot process according to at least one embodiment.
Figure 10B:
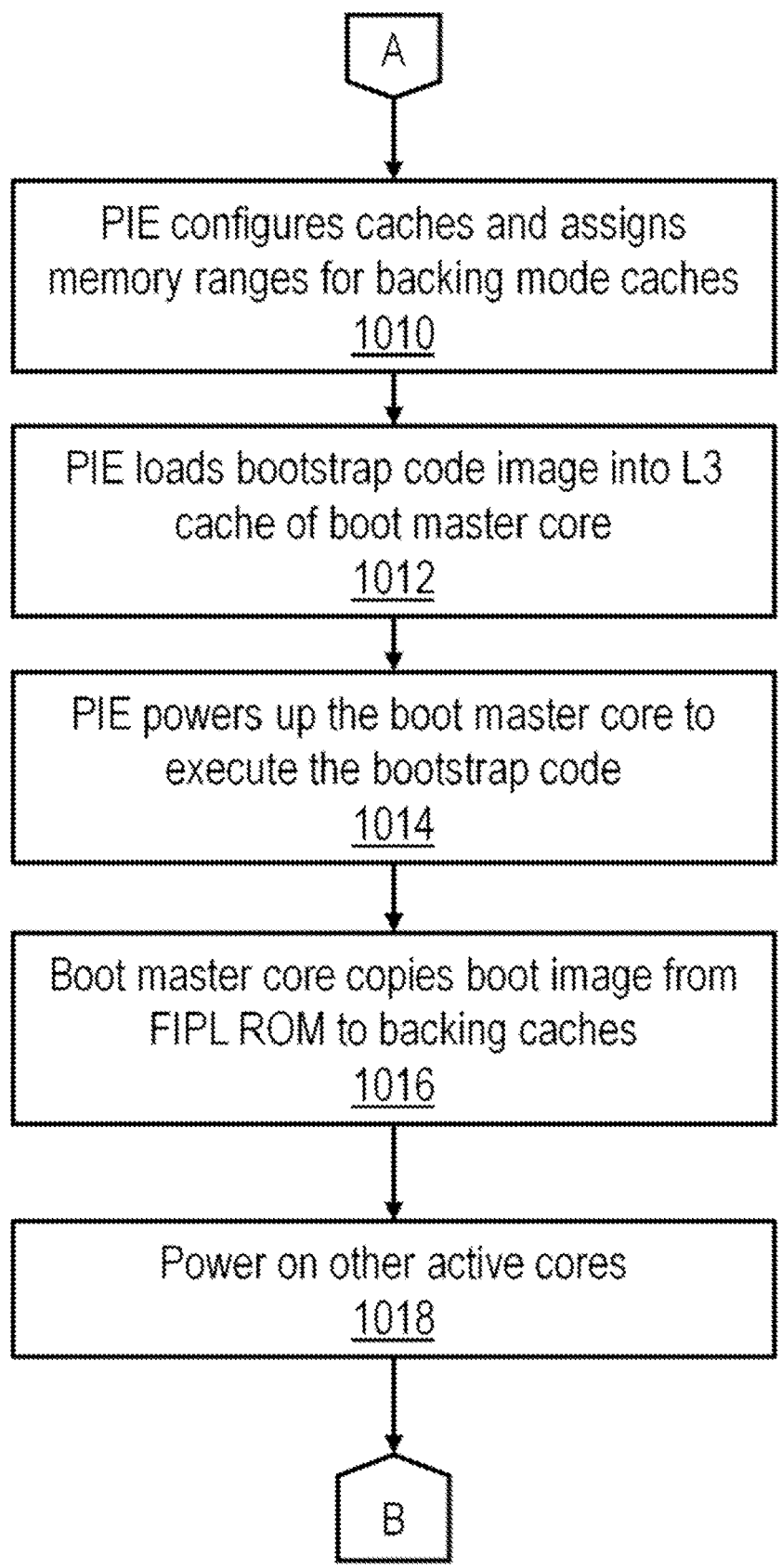
Figure 10C:
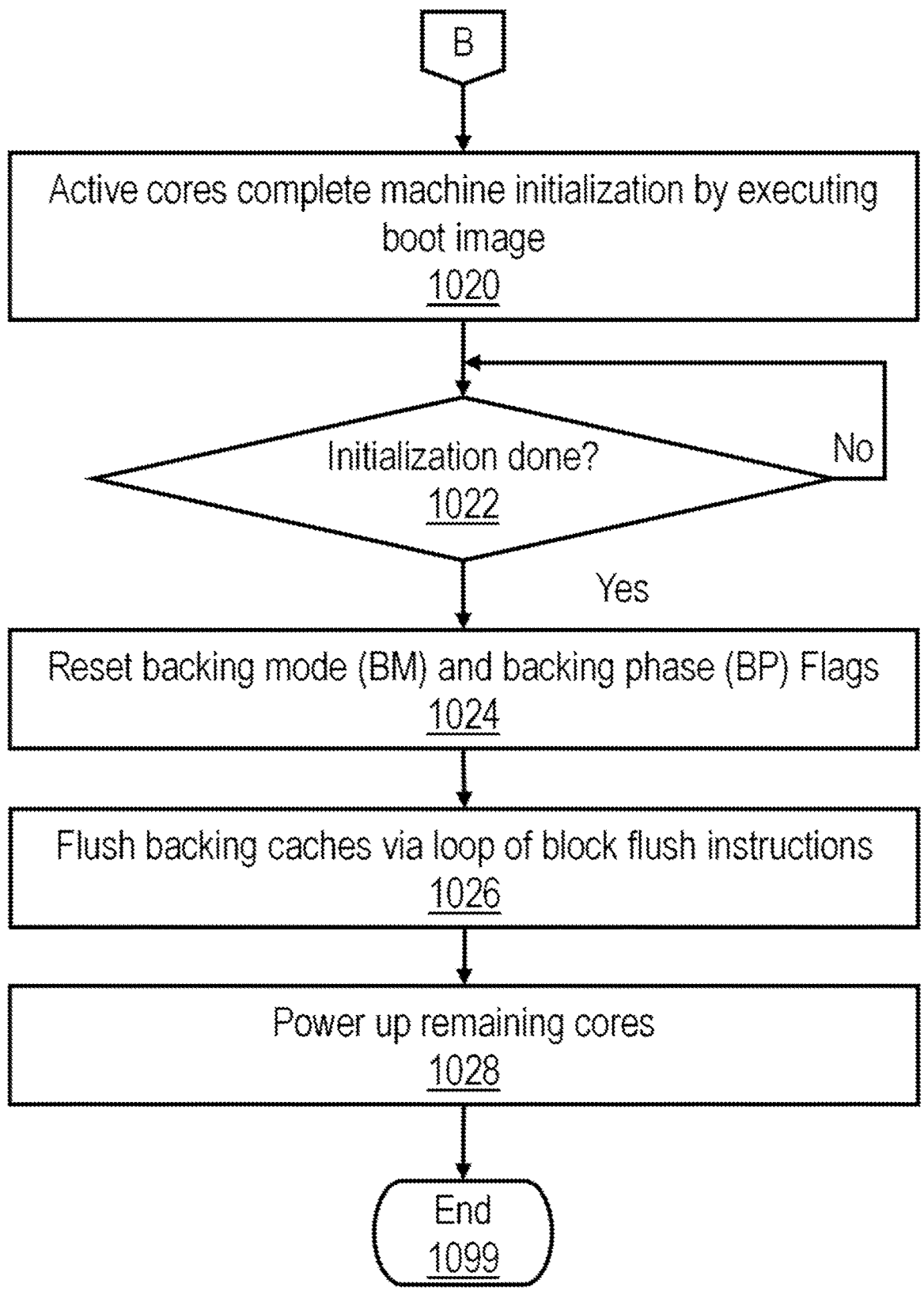

According to an example embodiment, the Boot Phase flag (BP flag) 402 may be a flag that indicates that this cache (L3 Cache 232a) is in a boot phase and therefore, cannot cast out any lines to system memory, such as System Memory 108, because it is not yet initialized. Thus, according to an example embodiment, all cast outs by an active L3 cache 232 whose BP flag is set must be lateral cast outs (LCOs) to other L3 caches 232 acting as backing caches emulating System Memory 108 as explained below. BP flag 402 may be set in the L3 caches for active cores in the boot phase as described below in the corresponding flowcharts (FIGS. 10A-10C).

According to an example embodiment, the L3 caches, unlike L2 caches, may be configured as a "backing store" memory to emulate memory, such as System Memory 108, until the memory is properly initialized. The Boot Mode flag (BM Flag) 404 may be set (i.e., BM Flag 404=1) to indicate that the L3 cache 232a is in boot mode and is emulating memory for a certain range of addresses. The range of addresses being emulated may be determined and defined by Boot Mode address register (BM Address) 406 and the known fixed size of the L3 cache, such as L3 cache 232b that operates as a backing store memory. The emulated memory range may be from the address specified by BM Address register 406 to the address specified in BM Address register 406 plus the known L3 cache size. In addition, according to the first embodiment, during boot mode, an L3 cache emulating system memory 108 is typically placed in a direct mapped mode and directory DIR 412 and CACHE 414 are preloaded with values such that the L3 cache holds an image of the assigned address range that is initialized to zeros (or whatever other values may be necessary) as described below at block 1010 of FIG. 10B. When an L3 cache in boot mode receives an LCO to an address within the configured range, the L3 cache will update the specific cache line associated with the LCO address, thereby updated the emulated copy of system memory.

According to the first embodiment, the BM flag 404 and the BP flag 402 may never be set at the same time. The BP Flag 402 may be set in boot phase for L3 caches that are actively executing the boot code to initialize the machine to indicate that cache line evictions from this cache must be done as LCOs and not normal cast outs to system memory. The BM flag 404 may be set for those caches that are acting as backing store caches that emulate system memory. When an L3 cache is configured as a backing store emulating memory, the L2 cache and the processor core associated with that L3 cache may be powered off and therefore, will not generate any requests that would bring lines into the L3 cache or cause a cast out from the L3 cache that is acting as a backing store memory. At a backing store L3 cache, two main operations may occur. First, the L3 cache SN machine, such as SN 418, may respond to a request to read data contained within the L3 cache from another L2 cache and provide a copy of said data to the requesting cache (see FIG. 9 for more details). Also, a CI machine, for example CI 410, may process an LCO operation from another active L3 cache and update the emulated image of memory contained in the L3 cache (see FIG. 8 for more details). In general, no other updates of data occur in a backing store L3 cache 232.

Figure 5:
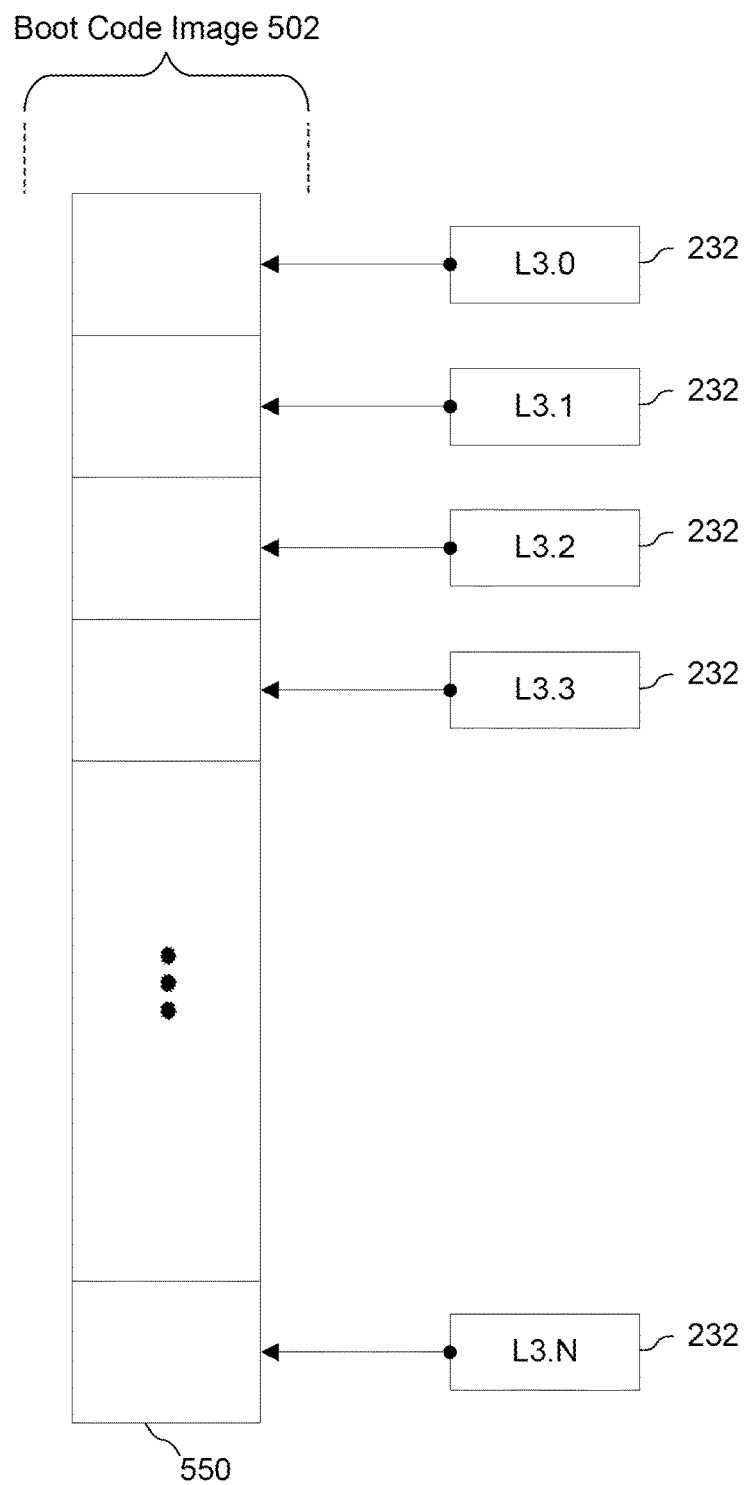
FIG. 5 depicts an emulating range structure of system memory according to the first embodiment.

With reference now to FIG. 5, that depicts an emulated range 550 of system memory 108 according to the first embodiment. According to the first embodiment, the L3 caches 232 (labeled L3.X where X is the number of the backing cache) are assigned to contiguous address regions based on the values loaded into the BM Address registers, such as BM Address 406 (FIG. 4), in the L3 caches that are acting as backing store memories. The emulating range of backing store memories may be used to store the Boot Code Image 502 that may be required to boot the system.

Figure 6:
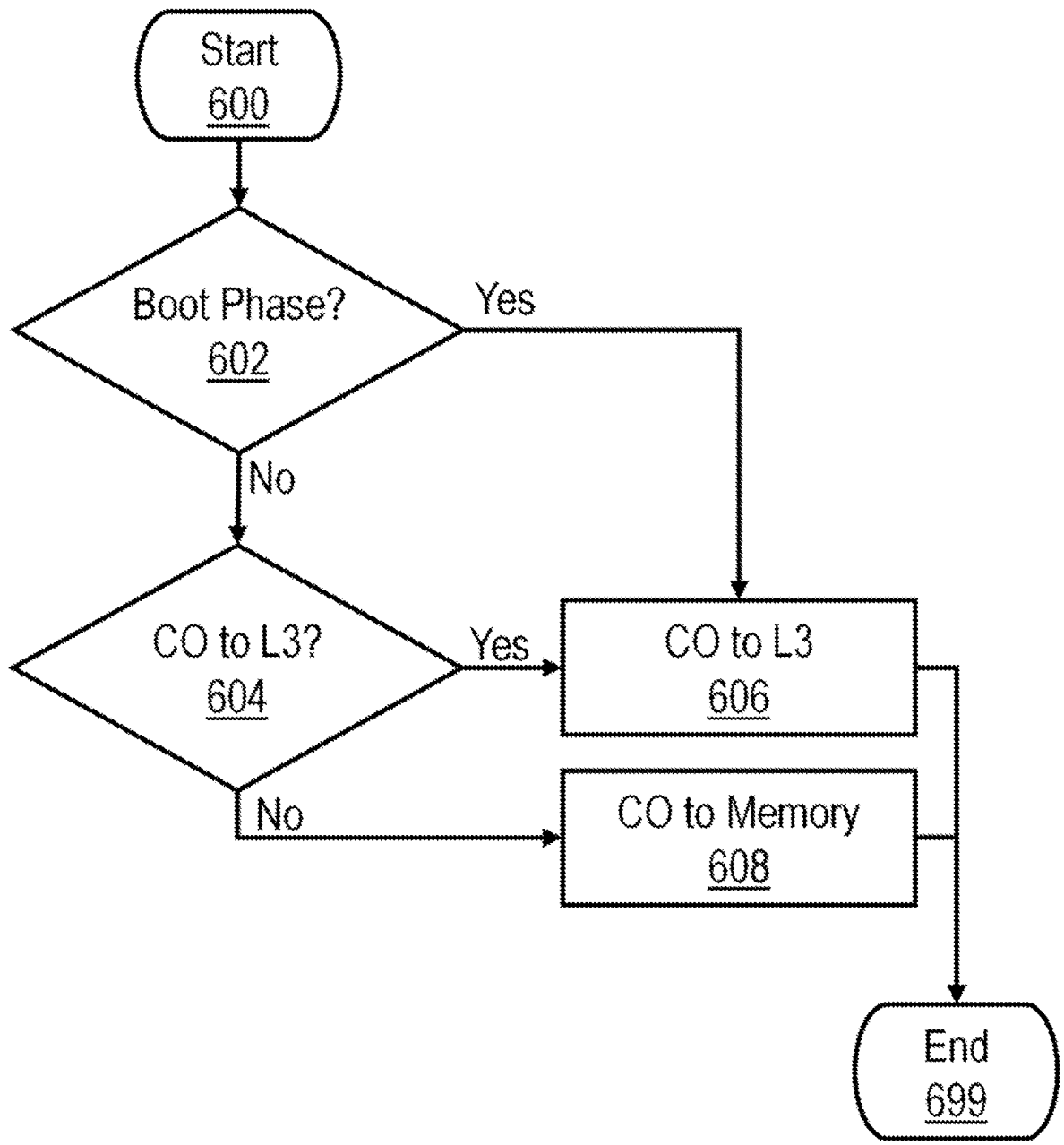
FIG. 6 is a high-level logical flowchart of L2 cache cast out (CO) behavior according to the first embodiment.

With reference now to FIG. 6, there is illustrated a high-level logical flowchart of modified L2 cast out machine behavior according to at least on embodiment. The process begins at block 600 and proceeds to block 602. According to the first embodiment, at step 602, the L2 cache machine logic may determine whether the system is in a boot phase by reference to BP Flag 302 described above. In response to a positive determination (L2 cache 230 is an active cache in a boot phase as indicated by BP Flag 302 being set), the process proceeds to block 606 illustrating CO machine 306 performing a cast out to L3 cache 232. After block 606, the process terminates at block 699. In the boot phase, the L2 cache must perform all cast outs to the associated L3 cache as main memory 108 is not yet initialized and available. Returning to block 602, in response to a negative determination at block 602 (i.e., BP Flag 302 is not set), the process proceeds to block 604. At block 604 (normal, non-boot phase operation), the L2 cache determines whether the cache line should be cast out to the L3 cache or to main memory according to various operational conditions. In response to a positive determination at block 604, the process proceeds to block 606 which has been described. In response to a negative determination, the process proceeds to block 608 illustrating CO 306 machine performing a cast out to main memory 108. After block 608, the process terminates at block 699.

Figure 7:
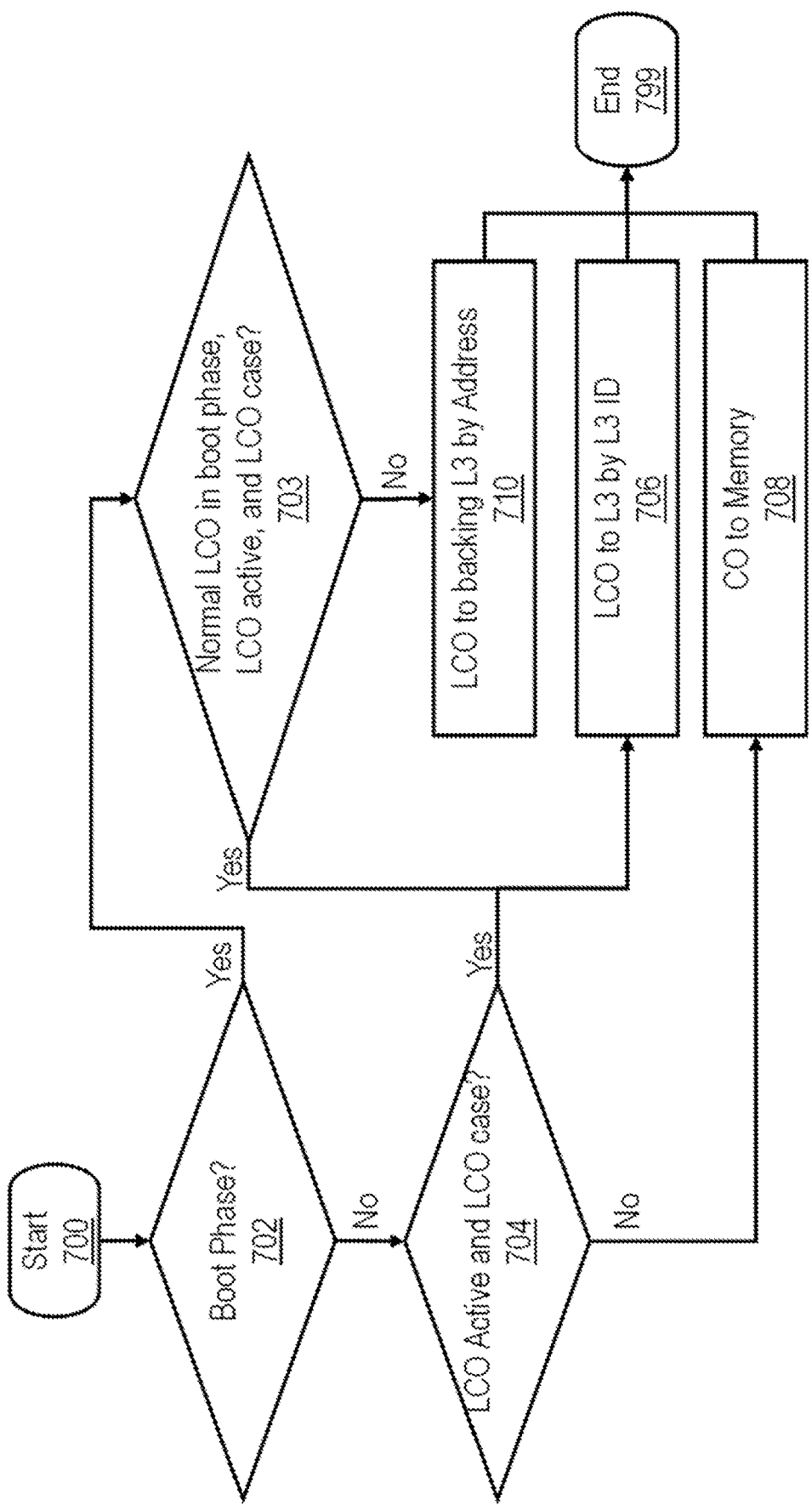
FIG. 7 is a high-level logical flowchart of L3 cache cast out (CO) behavior according to the first embodiment.

With reference now to FIG. 7, there is illustrated a high-level logical flowchart of modified L3 cast out machine behavior according to at least one embodiment. The process begins at block 700 and proceeds to block 702. According to the first embodiment, at step 702, the L3 cache CO logic may determine whether the system is in a Boot Phase by reference to BP Flag 402 described above. In response to a positive determination (L3 cache 232 is an active cache in a boot phase as indicated by BP Flag 402 being set), the process proceeds to block 703. At block 703, a determination is made whether normal LCOs are permitted (this occurs in boot phase only when multiple active core/cache-sets are available and normal lateral cast outs between these cache sets is desired), LCOs are active, and this particular cast out is a case that should be processed as a Lateral Cast Out. In response to a positive determination at block 703, the process proceeds to block 706 illustrating L3 CO machine 416 performing a Lateral Cast Out targeted based on an L3 ID field indicating the L3 cache 232 to which the LCO is targeted. The process then terminates at block 799. In response to a negative determination at block 703, the process proceeds to block 710 illustrating L3 CO machine 416 performing a Lateral Cast Out targeted based on cache address to a backing L3 cache 232 responsible for emulating memory for that address. The process then terminates at block 799. Returning to block 702, in response to a negative determination at block 702 the process proceeds to block 704 illustrating L3 CO machine 416 determining (in a normal operation non-boot phase) whether LCOs are active and if this particular cast out should be processed as an LCO. In response to a positive determination at block 706, the process proceeds to block 706 which has been described. In response to a negative determination at block 706, the process proceeds to block 708 illustration L3 CO machine 416 performing a normal cast out to main memory 108. After block 708, the process terminates at block 799.

Figure 8:
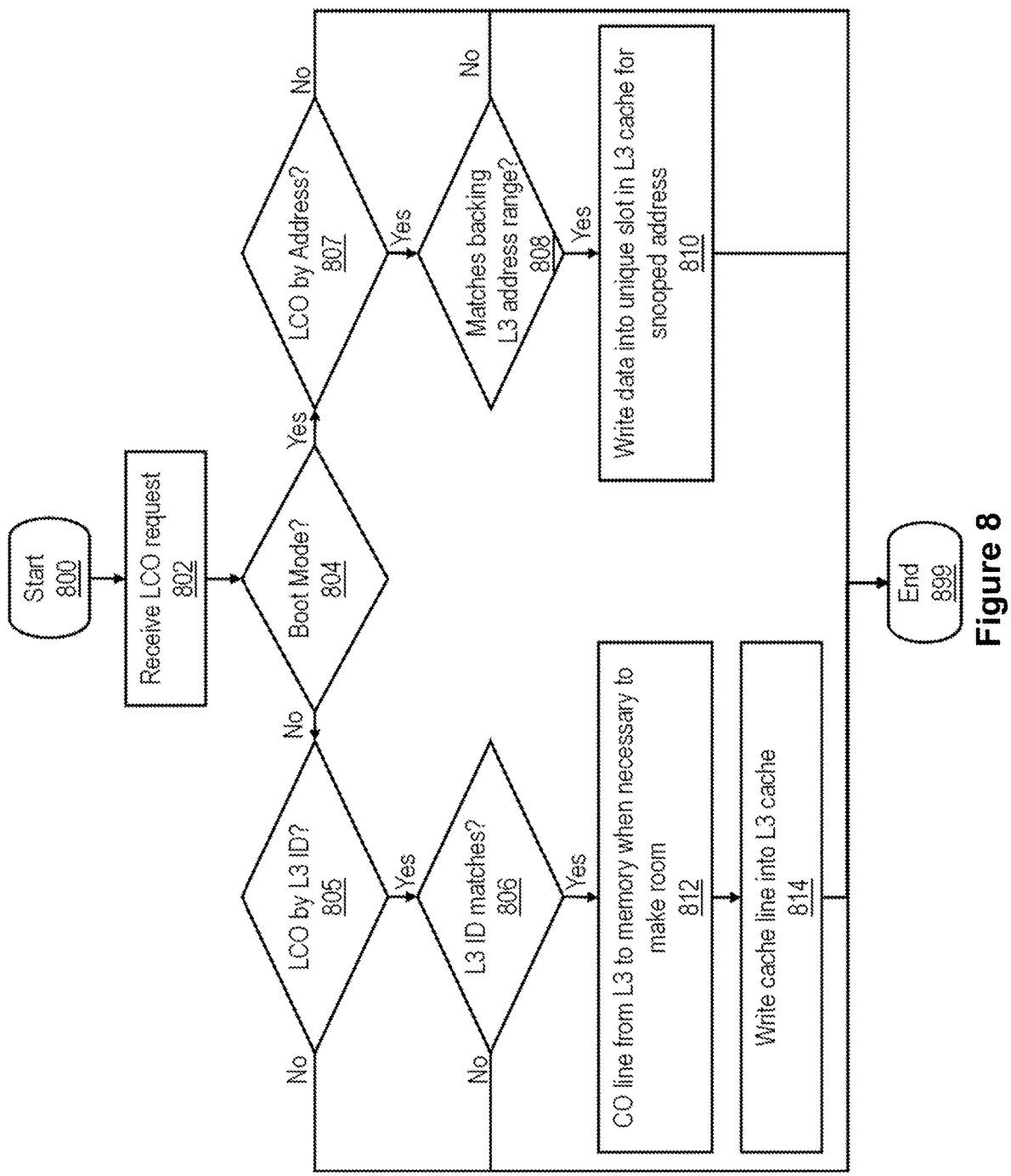
FIG. 8 is a high-level logical flowchart of an LCO processing in L3 cache according to the first embodiment.

With reference now to FIG. 8, there is illustrated a high-level logical flowchart of processing a snooped LCO request (either an LCO by address or an LCO by L3 ID) by an L3 cache according to at least one embodiment. According to the first embodiment, an LCO operation is processed at an L3 cache. The process begins as block 800 and proceeds to block 802 illustrating L3 cache 232 receiving an LCO operation (either an LCO by address, see block 710, or an LCO by L3 ID, see block 706) at CI machine 410. The process then proceeds to block 804 which illustrates CI machine 410 determining if L3 cache 232 is a backing store cache by referring to boot mode flag 404. In response to a negative determination at block 804, the process proceeds to block 805 which determines if the LCO received at block 802 is an LCO routed by L3 cache ID. If not, the received LCO is not intended for an active peer L3 cache and is an LCO intended for a backing cache, and the process then terminates at block 899. In response to a positive determination at block 805, the process proceeds to block 806 where CI machine 410 determines if the L3 ID for the LCO matches the L3 cache containing CI machine 410. If the determination at block 806 is a negative one, the LCO is not targeted at the current L3 cache and the process terminates at block 899. If, however, the determination at block 806 is a positive determination, the process proceeds to block 812 illustrating an L3 CO machine 416, if necessary, to make room for the incoming LCO, evicting a line from the current L3 cache 232 according to the process illustrated in FIG. 7. The process then proceeds to block 814 illustrating CI machine 410 writing the LCO cache data into cache 414 and updating directory 412. The process then terminates at block 899.

Returning to block 804, in response to a positive determination at block 804, the process proceeds to block 807 which determines if the LCO received at block 802 is an LCO routed by address. If not, the received LCO is not intended for a backing store cache and is an LCO between multiple active L3 caches, and the process then terminates at block 899. In response to a positive determination at block 807, the process proceeds to block 808 where CI machine 410 determines if the LCO address matches the address range handled by the L3 cache containing CI machine 410. If the determination at block 8080K is a negative one, the LCO is not targeted at the current L3 cache and the process terminates at block 899. If, however, the determination at block 808 is a positive determination, the process proceeds to block 810 illustrating the CI machine 410 writing the data contents of the LCO to the unique position in the backing L3 cache corresponding to the address of the LCO. The process then terminates at block 899.

Figure 9:
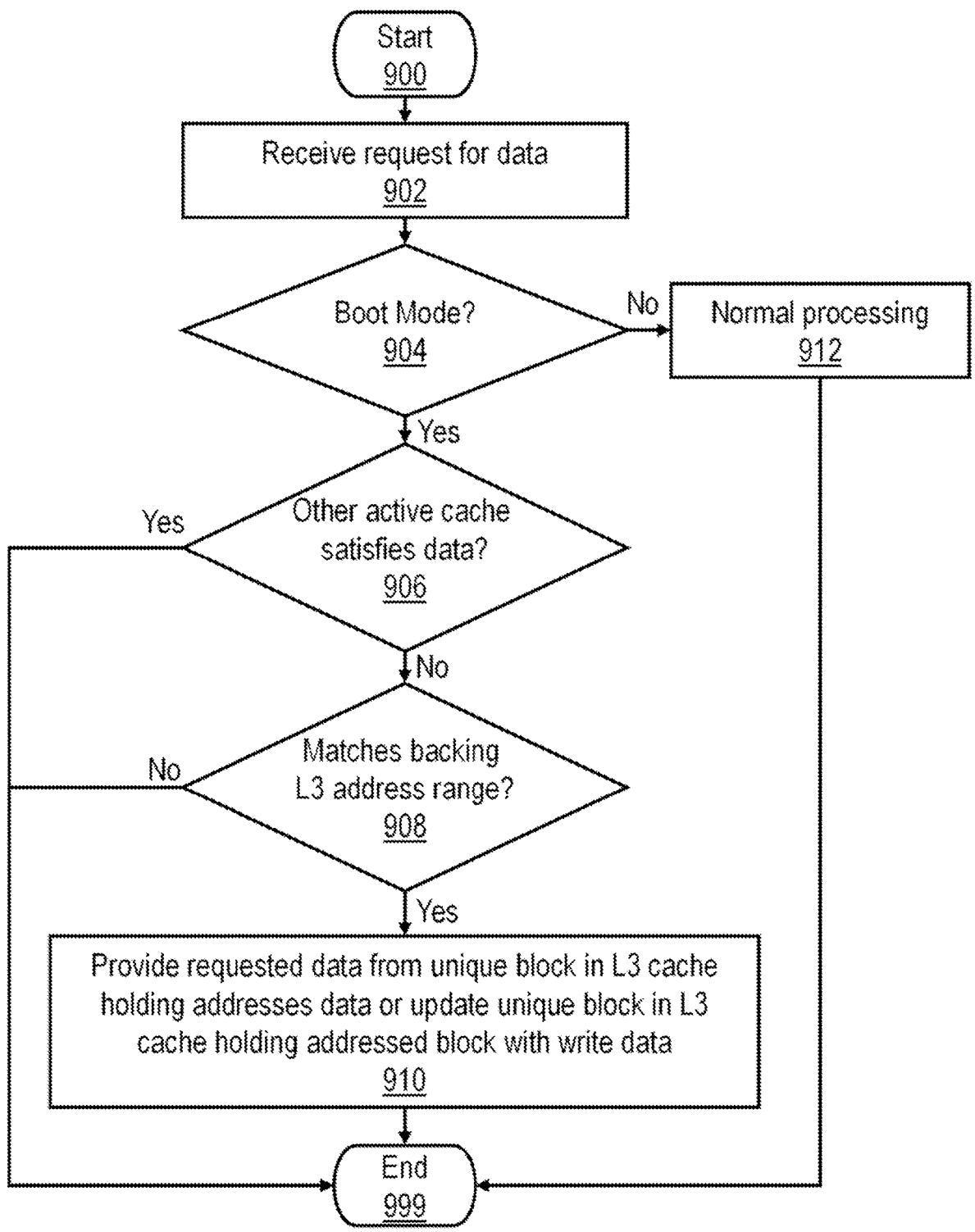
FIG. 9 is a high-level logical flowchart of processing an L3 cache request on the bus according to the first embodiment.

With reference now to FIG. 9, there is illustrated a high-level logical flowchart of processing a bus memory operation request (a read or write request for data including DMA writes) by an L3 cache 232 according to at least one embodiment. The process begins at block 900 and proceeds to block 902 illustrating L3 cache 232 receiving a memory operation request on local interconnect 114. The process then proceeds to block 904 illustrating L3 cache 232 determining if the cache is in boot mode (i.e., is a backing store cache) by reference to boot mode flag 404. If L3 cache 232 is not in boot mode, the process proceeds to block 912 illustrating the L3 cache performing conventional processing on the operation as and if necessary, to satisfy the memory operation request. Thereafter the process terminates at block 999. However, in response to a positive determination at block 904, the process proceeds to block 906. At block 906, the L3 cache 232 determines if some other active cache has satisfied the operation. In particular, if there are more than one active core/cache-set pairs, a memory operation request may be satisfied by an active cache and the current backing-store L3 cache 232 need not respond to the operation. In response to a positive determination at block 906, the process terminates at block 999. However, due to a negative determination and block 906, the process proceeds to block 908 illustrating L3 cache 232 determining, by reference to BM Address register 406, whether the address of the received memory operation request is within the range assigned to this backing-store L3 cache 232. As the results of a negative determination at block 906, the process terminates at block 999. As the result of a positive determination at block 908, the process proceeds to block 910 illustrating L2 cache 232 processing the memory operation request by either providing the requested data to a read operation or updating the image of memory contained in L3 cache 232 due to a write operation. After block 910, the process terminates at block 999.

With reference now to FIGS. 10A-10C, there is illustrated high-level logical flowcharts of a boot process for data processing system 100 according to at least one embodiment. The process begins at block 1000 and proceeds to block 1002 illustrating the data processing system 100 being powered on and BMC 120 issuing reset indications to each processing unit 102. The process then proceeds to block 1004 illustrating Reset logic (RL) 240 initializing processor core 200a/200b, L2 caches 230a/230b, L3 caches 232a/232b, Fabric Controller 216, Memory Controller 206, PIEs 248, and I/O controller 214 within each processing unit to a known good state. The process then proceeds to block 1006 illustrating PIEs 248 beginning to execute boot code out of attached SMs 248. The process then proceeds to block 1008 illustrating PIEs 248 determining the configuration for data processing system 100 and assigns core/cache-set pairs as active or inactive based on the configuration of data processing system 100. The process then proceeds through off-page connector A to block 1010 illustrating PIEs 248 configuring active and inactive core/cache-set pair by, among other things, setting BP flags 302 and 304, BM flags 404, and BM Address registers 406 appropriately based on the configuration of data processing system 100. The process then proceeds through off-page connector A to block 1012 illustrating PIE 248 for the boot master core loading a bootstrap code image from attached small memory 248 into L3 cache 232 for the boot mater core/cache pair. The process then proceeds to block 1014 illustrating PIE 248 for the master boot core powering up master boot processor core 200 to execute the bootstrap code image loaded into L3 cache 232 at block 1012. The process then proceeds to block 1016 illustrating boot master core copying the main boot code image from FIPL ROM 116 to main memory, emulated by backing caches. The process then proceeds to block 1018 where the other active cores, if any, are powered on to begin executing the main boot code image loaded at step 1016. The process continues through off page connector B to step 1020 illustrating the active core(s) configuring data processing system 100 by executing the main boot code image loaded at block 1016. Block 1022 illustrates the processing waiting until this configuration is complete and in particular that main memory 108 has been initialized and is available. After a positive determination at block 1022, the process proceeds to block 1024 illustrating PIEs 248 resetting BM and BP flags as necessary. The process then continues to block 1026 illustrating one or more active cores executing cache block flush instructions to write the emulation code image to main memory 108. Finally, the process proceeds to block 1028 where the remaining processor cores 200 are powered up. The process then terminates at block 1099.

Figure 11:
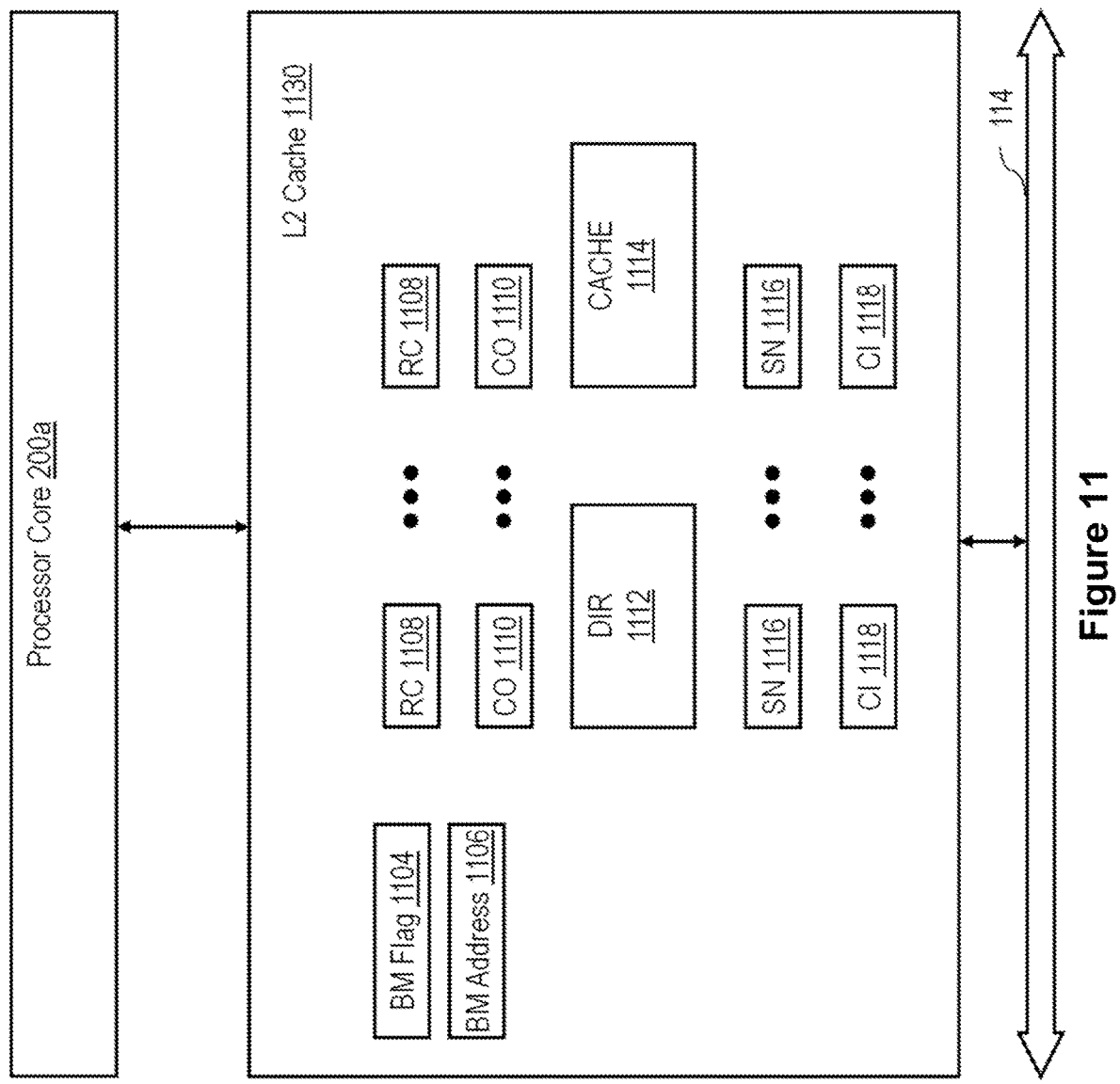
FIG. 11 is a more detailed block diagram of an L2 cache elements according to a second embodiment.

With reference now to FIG. 11, there is illustrated a more detailed block diagram of an L2 cache according to a second embodiment. According to the second embodiment, data processing system 100 does not contain L3 caches, the L2 cache level is the last-level cache before system memory, and the L2 cache does not support lateral cast outs. To practice the present disclosure in such a system, a modified L2 cache 1130 as shown in FIG. 11, is employed. L2 cache 1130 includes BM flag 1104 which is utilized, as above, to indicate that L2 cache 1104 is a backing-store cache. BM address register 1106 indicates the base address of the region of memory backing store L3 cache is responsible for when BM Flag 1104 is set and extends from the base address to the base address plus the size of L2 cache 1130. RC machines 1108, CO machines 1110, and SN machines 1116 operate in an analogous fashion to RC machines 304, CO machines 306, and SN machines 312, respectively. CI machine 1118 (in a backing store L2 cache 1130) is responsible for monitoring for cast out operations from active L2 caches 1130 that reside within the memory region backing store cache 1130 is responsible for and for updating the cache blocks in backing store cache 1130 as necessary. In an L2 cache 1130 with BM Flag not set, the CI machines are disabled and do not update cache 1130. Directory DIR 1112 and Cache CACHE 1114 operate analogously to Directory DIR 308 and Cache CACHE 310 respectively. Because normal CO operations are used by active L2 caches, no Boot Phase (BP) flag is required to prevent normal cast outs as in the prior embodiment.

Figure 12:
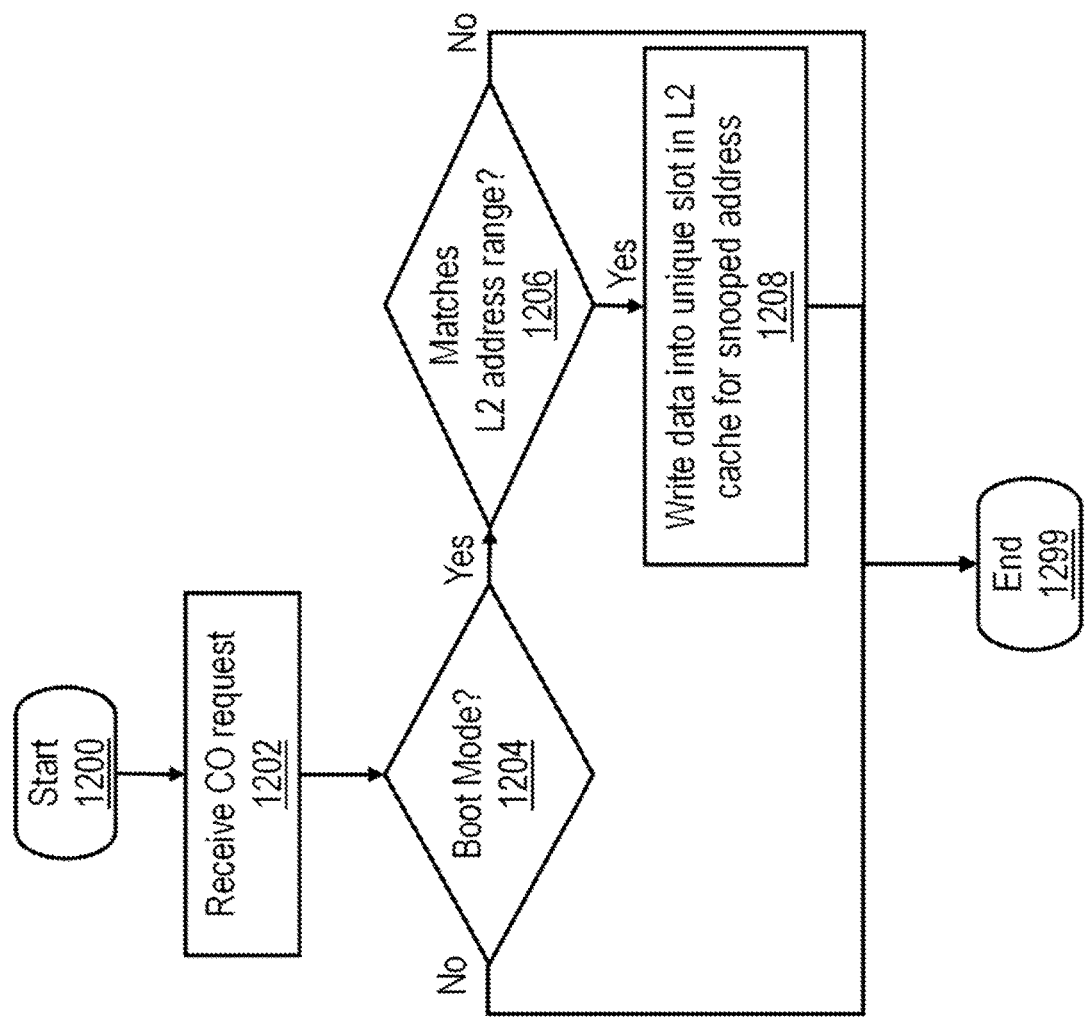
FIG. 12 is a high-level logical flowchart of L2 cast out (CO) behavior according to the second embodiment.

With reference now to FIG. 12, there is illustrated a high level logical flowchart of L2 cache 1130 handling of a received cast out operation from another active L2 cache 1130. The process begins at block 1200 and proceeds to block 1202 illustrating L2 cache 1130 receiving a cast out from another active L2 cache 1130. The process then proceeds to block 1204 illustrating L2 cache 1130 determining if BM flag 1104 is set. Based on a negative determination, indicating that cache 1130 is not a backing store cache, the process terminates at block 1299. Based on a positive determination at block 1204, the process proceeds to block 1206 illustrating L2 cache 1130 determines whether the address of the received cast out falls within the range of address for which backing cache 1130 is responsible by consulting BM Address register 1106. In response to a negative determination at block 1206, the process terminates at block 1299. However, due to a positive determination at block 1208, CI machine 1118 processes the received cast out and updates DIR 1112 and CACHE 1114 to reflect the newly written data. Thereafter the process terminates at block 1299. Those skilled in the art will readily comprehend the minor changes necessary to FIGS. 10A-10C required to practice the present disclosure in an embodiment with L2 caches 1130 and no L3 caches.

What is claimed is:

1. A method for using idle caches as a backing store for a boot code, the method comprising:
designating a boot core and an active cache from a plurality of cores and a plurality of caches;
configuring remaining caches from the plurality of caches to act as a backing store memory, wherein the remaining caches are those neither designated as the boot core nor the active cache;
modifying the active cache to convert cast outs to a system memory into lateral cast outs to the backing store memory;
copying a boot image to the backing store memory; and
executing the boot image by the boot core.

2. The method of claim 1, wherein configuring the remaining caches from the plurality of caches to act as the backing store memory further comprises:
placing the remaining caches in a direct mapped mode; and
assigning a specific portion of a physical address space to each of the remaining caches.

3. The method of claim 2, wherein the plurality of caches are modified L3 caches, wherein each modified L3 cache has a boot mode flag and a boot phase flag.

4. The method of claim 3, further comprising:
setting the boot mode flag, the boot phase flag, and a boot mode address register to each of the remaining caches.

5. The method of claim 1, wherein configuring the remaining caches from the plurality of caches to act as the backing store memory further comprises:
configuring the remaining caches to accept Direct Memory Access (DMA) writes to the backing store memory.

6. The method of claim 1, wherein the plurality of caches are modified L2 caches, wherein each modified L2 cache has a boot mode flag.

7. The method of claim 1, wherein executing the boot image by the boot core is performed by loading a bootstrap code image from an attached small memory into the active cache.

8. A computer system for using idle caches as a backing store for a boot code, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
designating a boot core and an active cache from a plurality of cores and a plurality of caches;
configuring remaining caches from the plurality of caches to act as a backing store memory, wherein the remaining caches are those neither designated as the boot core nor the active cache;
modifying the active cache to convert cast outs to a system memory into lateral cast outs to the backing store memory;
copying a boot image to the backing store memory; and
executing the boot image by the boot core.

9. The computer system of claim 8, wherein configuring the remaining caches from the plurality of caches to act as the backing store memory further comprises:
placing the remaining caches in a direct mapped mode; and
assigning a specific portion of a physical address space to each of the remaining caches.

10. The computer system of claim 9, wherein the plurality of caches are modified L3 caches, wherein each modified L3 cache has a boot mode flag and a boot phase flag.

11. The computer system of claim 10, further comprising:
setting the boot mode flag, the boot phase flag and a boot mode address register to each of the remaining caches.

12. The computer system of claim 8, wherein configuring the remaining caches from the plurality of caches to act as the backing store memory further comprises:
configuring the remaining caches to accept Direct Memory Access (DMA) writes to the backing store memory.

13. The computer system of claim 8, wherein the plurality of caches are modified L2 caches, wherein each modified L2 cache has a boot mode flag.

14. The computer system of claim 8, wherein executing the boot image by the boot core is performed by loading a bootstrap code image from an attached memory into the active cache.

15. A computer program product for using idle caches as a backing store for a boot code, the computer program product comprising:
one or more computer-readable tangible storage medium and program instructions stored on at least one of the one or more tangible storage medium, the program instructions executable by a processor, the program instructions comprising:
program instructions to designate a boot core and an active cache from a plurality of cores and a plurality of caches;
program instructions to configure remaining caches from the plurality of caches to act as a backing store memory, wherein the remaining caches are those neither designated as the boot core nor the active cache;
program instructions to modify the active cache to convert cast outs to a system memory into lateral cast outs to the backing store memory;
program instructions to copy a boot image to the backing store memory; and
program instructions to execute the boot image by the boot core.

16. The computer program product of claim 15, wherein program instructions to configure the remaining caches from the plurality of caches to act as the backing store memory further comprises:
program instructions to place the remaining caches in a direct mapped mode; and
program instructions to assign a specific portion of a physical address space to each of the remaining caches.

17. The computer program product of claim 16, wherein the plurality of caches are modified L3 caches, wherein each modified L3 cache has a boot mode flag and a boot phase flag.

18. The computer program product program product of claim 17, further comprising:
program instructions to set the boot mode flag, the boot phase flag, and a boot mode address register to each of the remaining caches.

19. The computer program product of claim 15, wherein program instructions to configure the remaining caches from the plurality of caches to act as the backing store memory further comprises:

program instructions to configure the remaining caches to accept Direct Memory Access (DMA) writes to the backing store memory.

20. The computer program product of claim 15, wherein the plurality of caches are modified L2 caches, wherein each modified L2 cache has a boot mode flag.

* * * * *